Patented Nov. 15, 1949

2,488,135

UNITED STATES PATENT OFFICE 2,488,135

PROCESS OF MOLDING COMPOSITIONS COMPRISING ALGINATES

Edwin George Millatt, Maidenhead, England, assignor to Alginate Industries Limited (formerly known as Cefoil Limited), Maidenhead, England, a British company No Drawing. Application July 10, 1946, Serial No. 682,587. In Great Britain April 25, 1945

Section 1, Public Law 690, August 8, 1946
Patent expires April 25, 1965

12 Claims. (Cl. 18—55)

This invention relates to the manufacture of plastics from alginates and is particularly applicable to water-insoluble metal alginates such as alginates of nickel, zinc, aluminium, copper and the like.

It is known that alginates of metals such as those set forth above in the form of insoluble powders can be made to cohere. They do not exhibit plastic flow characteristics however and therefore it has been impossible to produce transparent or pigmented plastic articles by the moulding methods of the plastic industry.

The object of the present invention is to produce from a moulding composition containing an alginate treated to induce plastic flow articles which are tough, transparent, capable of taking a high polish and of being worked by machine tools.

The present invention comprises a process of producing moulded plastics consisting in taking a moulding powder which comprises water-insoluble metal alginate, a suitable ammonium-yielding ingredient, water in appropriate excess of the equilibrium water in the alginate, together with a filler if desired, moulding in a die under heat and pressure and, after moulding, eliminating ammonium alginate from the product.

It is found that the introduction of an ammonium-yielding ingredient and water into the powder makes it capable of plastic flow under heat and pressure so that it can be satisfactorily moulded to shape. It is believed that the effect is to cause a temporary superficial combination of ammonium with the alginate, displacing the metal radical; as ammonium alginate is readily soluble in water the result is that the particles of the powder become superficially coated with dissolved or jellified ammonium alginate and become capable of slipping over one another so that the product can be caused to flow under the effect of heat and pressure into the exact shape of a mould and compressed. At all events powders having as their essential ingredients water-insoluble metal alginates and ammonia solution or ammonium-yielding salts do exhibit plastic flow when heated. If, however, moulded plastics so produced without any other precaution or treatment are wetted they swell and distort, presumably owing to residual ammonia or ammonium compounds taking up water and swelling. Ammonium alginate is well known to be capable of absorbing large quantities of water and swelling.

By obviating the presence of ammonium alginate in the product the tendency to swell in contact with moisture can be overcome, and the products become useful and practical commercial articles.

One way in which ammonium alginate can be obviated from the product is by volatilisation of ammonia and if the articles are stored, particularly at a somewhat raised temperature for a sufficient time after moulding, elimination of ammonia will occur. In the absence, however, of means for hastening this action, it may take a long time, possibly many months. One way in which ammonium alginate can be more rapidly eliminated consists in introducing a chemical ingredient into the powder which will produce a reaction with ammonium alginate upon moulding, and so reconvert any such alginate to an insoluble form.

One type of ingredient which can be introduced into the moulding powder for the purpose of leading to the eventual obviation of the presence of ammonium alginate from the moulded product by reaction therewith consists of the borates of alkali or alkaline-earth metals. An alternative ingredient for the same purpose is trioxane. Again, if steps are taken to ensure that upon the formation of ammonium alginate the mixture will have an acid reaction, it is possible to include as ammonium alginate obviating ingredients bodies such as potassium chromate. Potassium chromate does not form alginates directly but, if potassium chromate is included, after a few hours the alginate will act as a reducing agent and set free potassium in the form of hydroxide; the potassium will combine with the acid ingredients of the powder and the chromium will combine with any ammonium alginate, setting free ammonia. Broadly speaking, ingredients have to be chosen which will not have too rapid a reaction, otherwise they may interfere with the plastic flow before the moulding operation has been completed.

In order to ensure that the material has an acid reaction upon moulding, it is convenient to add the ammonia in the form of a compound with a weak organic acid such as ammonium acetate, formate, tartrate or citrate. Alternatively, the ammonium may be employed in the form of a 0.880 ammonia solution, if borates are to be employed as eliminating ingredients for ammonia.

The following examples indicate various specific instances of satisfactory moulding powders and of the proposals carried out for their uses:

Example 1

A moulding powder is made consisting of the following ingredients:

| | |
|---|---|
| Zinc alginate _____ grammes__ | 15 |
| 0.880 ammonia _____ cubic centimetres__ | 3 |
| Sodium borate _____ grammes__ | 0.2 |

This powder may be moulded at a temperature of about 100° C. and under a pressure of about 1 ton per square inch and upwards and forms a homogeneous transparent mass in a few minutes. During the heating and pressing operation, after the body has been brought to shape, most of the ammonia and some of the water is driven off and the moulded article therefore does not subsequently shrink.

More of the ammonia may be removed by ageing the moulded articles for a time before placing them in commercial use, and the rate of loss can be increased by curing the articles at an elevated temperature. The smaller the amount of residual ammonia in the moulded article, the less is the tendency of the article to swell in water.

The moulded articles are very tough, capable of taking a high polish and can be worked by machine tools.

Pigmented articles may be produced by incorporating a suitable dye or colouring matter in the above powder.

Example 2

A moulding powder mixture is made of—

| | Parts |
|---|---|
| Zinc alginate | 15 |
| Ammonium acetate | 2 |
| Water | 3 |
| Filler | 15 |

This material will mould in a press under heat and pressure satisfactorily and keep its shape well. If it is to be made water resistant, however, it must be stored under dry conditions for several months, during which time ammonia is gradually displaced and evaporates.

Example 3

| | Parts |
|---|---|
| Zinc alginate | 15 |
| Ammonium acetate | 3 |
| 0.880 ammonia (by volume) | 3 |
| Filler | 15 |

This material also moulds well and in time acquires water resistance although not so quickly as that of Example 2.

Example 4

| | Parts |
|---|---|
| Zinc alginate | 75 |
| Ammonium acetate | 10 |
| Potassium chromate | 1 |
| Water | 20 |
| Filler | 75 |

When this mixture is moulded acetic acid is set free which creates favourable conditions for the reduction of the chromate to the chromic state, the reducing agent being of course the alginate radical which is present. The resulting moulding is highly water resistant within 24 hours.

Example 5

| | Parts |
|---|---|
| Zinc alginate | 15 |
| Ammonium acetate | 3 |
| Trioxane | 1 |
| Filler | 15 |

This mixture (to which water should be added in a similar proportion to that of Example 4) can be moulded under heat and pressure in the same way as the examples previously described.

In any of the above examples the zinc alginate may be substituted by ferric alginate, beryllium alginate, aluminium, copper, nickel, cobalt, alginate or the like. For ammonium acetate there may be substituted ammonium formate.

I claim:

1. A process of producing moulded plastics consisting in making a moulding powder by mixing a water-insoluble metal alginate which forms the main bulk of the reactive constituents, an ammonium-yielding ingredient in quantity sufficient to be chemically equivalent to not more than a minor proportion of the alginate, a borate of a metal selected from the class consisting of alkali and alkaline-earth metals, and water in addition to the equilibrium water in the alginate but in quantity less than that which would make the powder into a paste, and die-shaping said powder under heat and pressure, thus causing the borate to react with soluble ammonium compounds formed, so as to substantially obviate the presence of said compounds in the moulded product.

2. A process of producing moulded plastics which comprises die-shaping under heat and pressure, a moulding powder consisting of a water-insoluble metal-alginate which forms a major proportion of the reactive constituents of the powder, an ammonium-yielding ingredient in quantity sufficient for the ammonium to be chemically equivalent to not more than a minor proportion of the alginate, and water in addition to the equilibrium water in the alginate but in quantity less than that which would make the powder into a paste, and ageing until the moulded product is substantially water-resistant.

3. A process as claimed in claim 2 wherein the product is maintained at super atmospheric temperature during ageing.

4. A process of producing moulded plastics consisting in making a moulding powder by mixing a water-insoluble metal alginate which forms the main bulk of the reactive constituents, an ammonium-yielding ingredient in quantity sufficient for the ammonium to be chemically equivalent to not more than a minor proportion of the alginate, a relatively small quantity, as compared with the quantity of the ammonium-yielding ingredient, of a borate of a metal selected from the class consisting of alkali and alkaline-earth metals, and water in addition to the equilibrium water in the alginate but in quantity less than that which would make the powder into a paste, die-shaping said powder under heat and pressure and ageing until the product is substantially water resistant.

5. A process as claimed in claim 4 wherein the moulding powder contains in addition to the reactive constituents, an inert filler.

6. A process of producing moulded plastics consisting in making a moulding powder by mixing a water-insoluble metal alginate which forms the main bulk of the reactive constituents, an ammonium-yielding ingredient in quantity sufficient for the ammonium to be chemically equivalent to not more than a minor proportion of the alginate, a relatively small quantity of trioxane as compared with the quantity of the ammonium-yielding ingredient, and water in addition to the equilibrium water in the alginate but in quantity less than that which would make the powder into a paste, die-shaping said powder under heat and pressure and ageing until the product is substantially water resistant.

7. A process as claimed in claim 6 wherein the moulding powder contains, in addition to the reactive constituents, an inert filler.

8. A process of producing moulded plastics consisting in making a moulding powder by mixing a water-insoluble metal alginate which forms the main bulk of the reactive constituents, a compound of ammonia with a weak acid in quantity sufficient for the ammonium to be chemically equivalent to not more than a minor proportion of the alginate, a relatively small quantity of an alkali chromate as compared with the quantity of said compound of ammonia, and water in addition to the equilibrium water in the alginate but in quantity less than that which would make the powder into a paste, die-shaping said powder under heat and pressure and ageing until the product is substantially water resistant.

9. A process as claimed in claim 8 wherein the compound of ammonia is ammonium acetate.

10. A process as claimed in claim 8 wherein the alkali chromate is potassium chromate.

11. A process as claimed in claim 8 wherein the moulding powder contains, in addition to the reactive constituents, an inert filler.

12. A process of producing moulded plastics consisting in making a moulding powder by mixing a water-insoluble metal-alginate which forms the main bulk of the reactive constituents, 0.880 ammonia solution in quantity sufficient to be chemically equivalent to not more than a minor proportion of the alginate and less than that which would make the powder into a paste, and a borate of a metal selected from the class consisting of alkali and alkaline-earth metals, and die-shaping said powder under heat and pressure, thus causing the borate to react with soluble ammonium compounds formed, so as to substantially obviate the presence of said compounds in the moulded product.

EDWIN GEORGE MILLATT.

REFERENCES CITED

The following references are of record in the file of this patent:

UNITED STATES PATENTS

| Number | Name | Date |
| --- | --- | --- |
| 1,415,850 | Erdahl | May 9, 1922 |
| 2,325,051 | Gross | July 27, 1943 |
| 2,359,512 | Dickson et al. | Oct. 3, 1944 |
| 2,397,145 | Joy et al. | Mar. 26, 1946 |